April 28, 1970 R. G. SMITH 3,508,573
MEANS FOR PROTECTING VALVE PARTS
Filed May 3, 1968
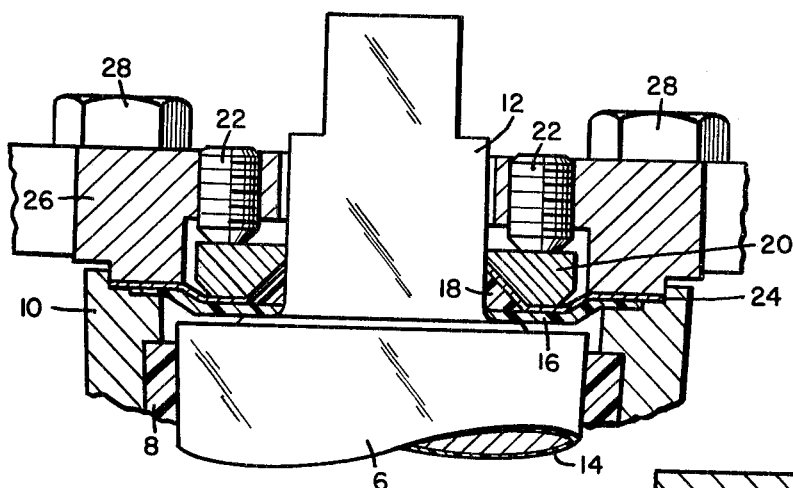
FIG. 1
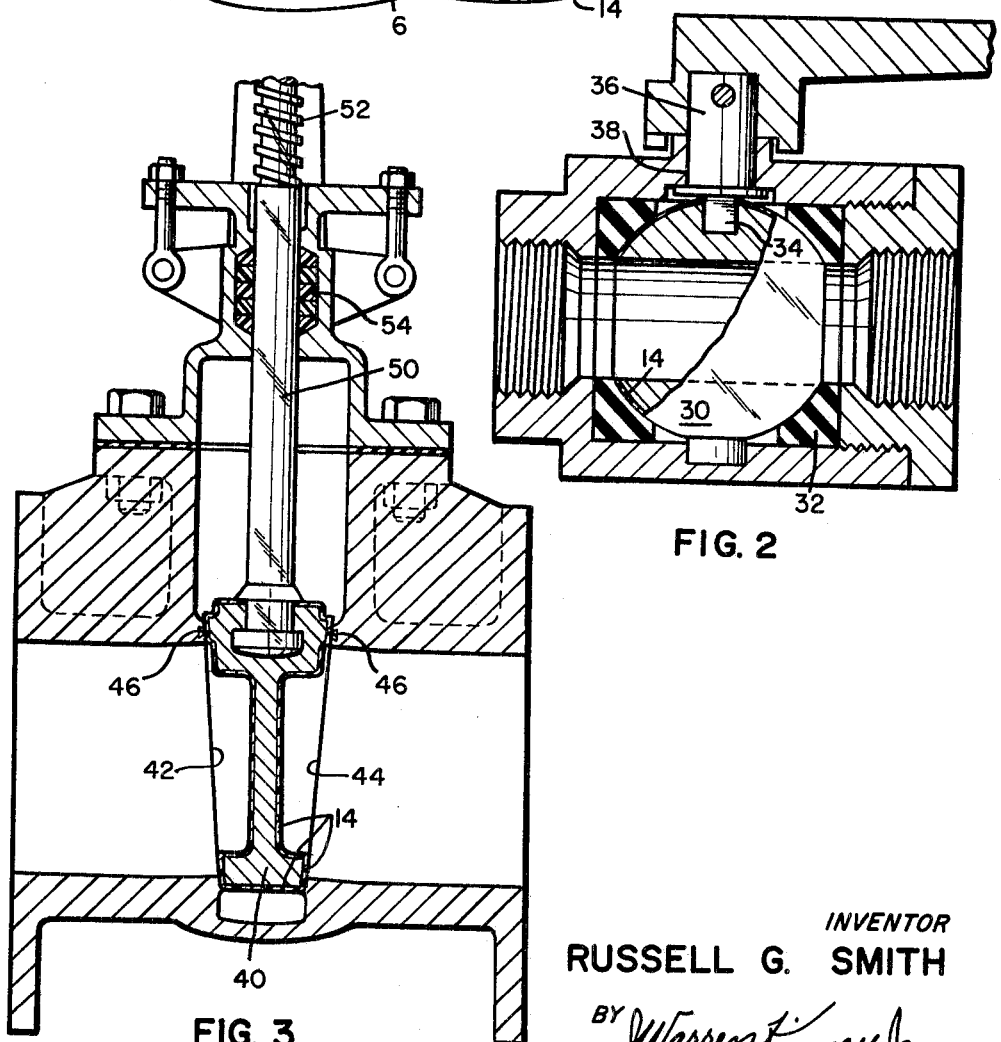
FIG. 2
FIG. 3
INVENTOR
RUSSELL G. SMITH
BY J. Warren Kinney Jr.
ATTORNEYS United States Patent Office 3,508,573
Patented Apr. 28, 1970

3,508,573
MEANS FOR PROTECTING VALVE PARTS
Russell G. Smith, Cincinnati, Ohio, assignor to Xomox Corporation, Cincinnati, Ohio, a corporation of Ohio
Filed May 3, 1968, Ser. No. 726,309
Int. Cl. F16k 5/02, 5/06, 3/18
U.S. Cl. 137—375
4 Claims

ABSTRACT OF THE DISCLOSURE

The movable valving member of any type of valve is coated with Teflon–S, a sprayable nonstick, self-lubricating, self-renewing finish based on a special fluorocarbon resin and suitable modifiers, dispersed in organic solvents. The coating is highly resistive to abrasion, and to attack by corrosives and solvents. When applied to valves, the coating discourages the formation of foreign particles within the valve which might score the seats thereof as the movable valving member is manipulated. In the event of scoring, however, the coated surface is self-renewing, or self-healing. The surfaces of valve parts coated with Teflon–S and working in contact with packings, seats, sealing elements and the like formed of Teflon, afford such advantages as nearly frictionless relative movement, the ability to self-renew in the event of scoring, and highly efficient sealing against fluid leakage past the coated surfaces. The coating endows the coated surface with a fluorocarbon-rich surface stratum which is responsible for the advantages aforesaid.

The present invention relates to a means for protecting valve parts against corrosion, frictional sticking and wear. It is a well known fact that the stems and other movable parts of valves used for controlling corrosive fluids, solvents and the like, are generally short-lived even though constructed of the finest and most expensive corrosion-resistive materials, usually metals or special alloys. Moreover, maintenance of such valves may be very costly in the matter of system shut-downs, when the valving members stick and refuse to move when required, because of the presence of corrosive deposits thereon. The conditions above mentioned are much aggravated when the valves are required to control corrosive materials or solvents at high temperatures, as is often the case.

An object of the invention is to provide a means for substantially prolonging the life and the trouble-free maintenance period of valve parts subjected to the deteriorating effects of corrosive fluids, solvents or the like, whether alkaline or acid of nature.

Another object of the invention is to prolong the life of vulnerable valve parts by spraying or otherwise coating such parts with a liquid plastic material known as "Teflon–S," which is a plastic material of the group consisting of polyethylene and its halogen substitute products characterized by high anti-friction properties and resistance to corrosives, solvents, and abrasion.

A further object of the invention is to prevent sticking and resistance to manipulation, of movable valve parts under adverse conditions as above recited, by an application of plastic material of the type mentioned.

Another object is to accomplish the objectives above recited, without labor and expense of a prohibitive nature.

The foregoing and other objects are attained by the means described herein and illustrated upon the accompanying drawing, in which:

FIG. 1 is a fragmental cross-section showing a plug valve embodying the present invention.

FIG. 2 is a fragmental cross-section showing a ball valve embodying the invention.

FIG. 3 is a fragmental cross-section showing a gate valve embodying the invention.

In FIG. 1, the plug valve includes a rotary metallic plug 6 abutting a deformable sleeve or liner 8 of Teflon or equivalent material anchored against rotation in the plug chamber of body 10. The material Teflon is identified as a plastic of the group consisting of polyethylene and its halogen substitute products characterized by high anti-friction properties and resistance to corrosives, solvents and abrasion.

The plug, and its stem 12 if desired, is to have applied thereto a coating 14 of Teflon–S, which is described as an abrasive-resistant coating of sprayable consistency, providing on the plug and/or stem a fluorocarbon-rich surface or stratum having a low coefficient of friction. The product Teflon–S is in composition basically like the Teflon of sleeve or liner 8 when solidified, and will accordingly have substantially the same characteristics thereof. Both products have highly desirable anti-stick, self-lubricating, and long-wearing qualities, and are self-renewing in use; that is, any scuffing or scoring of the Teflon surfaces will be temporary and the surfaces will renew themselves, once the cause of the scuffing or scoring has been displaced or removed.

The scuffing or scoring above mentioned may be caused by foreign material such as corrosion particles or accumulations, moving through the valve and possibly lodging between or upon the seating surfaces of the plug or the sleeve. By coating the plug and its port walls, the presence of corrosion particles or accumulations is greatly minimized, and the valving surfaces are effectively preserved against scoring and sticking, particularly when the valve is infrequently actuated. The coating of Teflon–S also prevents foreign matter buildup on the plug and its surfaces, further minimizing the risk of seat scoring as the plug is rotated, and thereby prolonging the useful life of the sleeve.

The product Teflon–S is applicable to the valve port by spraying, dipping, brushing or any other convenient technique, and requires baking onto the part and heat curing at approximately 600° F. metal temperature in order to attain maximum stratum hardness and abrasion resistance. The manufacturer, E. I. du Pont de Nemours & Co., Inc., identifies the product Teflon–S as a 958–200 Series single-coat, non-stick, self-lubricating finish based on a special fluorocarbon resin and suitable modifiers, dispersed in organic solvents.

The valving member coating 14 is especially desirable wherever it contacts a Teflon member such as the sleeve 8, diaphragm 16, and stem sealing ring 18. At these contact areas, the coating 14 cooperates with the Teflon member to very substantially reduce frictional resistance to rotation of the valving member, while at the same time enhancing sealing against fluid leakage past said contact areas.

In the valve of FIG. 1, a metallic pressure ring 20 advanced by means of screws 22 maintains mechanical pressure on a stiff metallic diaphragm 24 which overlies the non-metallic diaphragm 16 and sealing ring 18. The outer margins of the diaphragms are securely clamped between the valve body 10 and cover member 26, by means of screws 28.

The disclosure of FIG. 1 is intended as exemplary only of plug valves in general which may be benefitted by the coating means applied as above specified. In some forms of plug valves, the coating 14 may be applied only to the plug portion of the valving member exclusive of the stem or shank. However, application of the coating to all areas of the valving member may be considered desirable for precluding corrosion, scoring, or fluid leakage, irrespective of the nature of the surfaces upon which such coated areas may have contact or bearing.

The invention is applicable also to ball valves, of which FIG. 2 is illustrative, by example. Here the coating 14 is applied as a seating surface to movable valving member 30, for contact with the stationary seating member or liner 32 which lines the valve chamber. Liner 32 preferably is of Teflon, and has bearing upon the coating 14. The generally spherical coated ball member 30 may be rotated in any suitable manner, as by means of a key 34 fitted into a socket formed in the ball member, said key having a stem 36 rotatable in a bore 38 of valve body 40. The stem as well as the spherical portion of the valving member may carry a coating such as 14, of Teflon-S.

The invention is applicable as well to gate valves, of which FIG. 3 is generally illustrative. The movable valving member 40 carries the enveloping coating 14, which in the closed position of the valve bears against the stationary annular seats 42 and 44. The seats 42 and 44 may each include a Teflon seat insert 46 circumscribing said seats, and against which inserts may bear the Teflon-S coated seating surfaces of valving member 40. The coating 14 bearing upon the inserts 46 provides a virtually frictionless seal, which greatly reduces abrasive wear at the seats, and facilitates operation of the valve. The surfaces also are self-renewing, as explained in the description of FIG. 1.

In FIG. 3, it is desirable also to coat the stem 50 and its threads 52, as a deterrent to corrosion, sticking, and galling of the threads and other portions of the stem. Further, it is desirable that the packing 54 about the coated stem be of Teflon, to ensure easy frictionless stem rotation at all times.

Various other types of valves may be treated in the same way to impart thereto the advantages and improvements recited hereinbefore. Also, the Teflon-S coating may be applied with advantage to the interior and/or exterior surfaces of the valve bodies.

What is claimed is:

1. A valve for controlling flow of fluids highly destructive of metallic valve parts, said valve comprising a body having a chamber including a seat member of Teflon; a valving member movable relative to said seat member for controlling rate of flow through said chamber and means including a stem for imparting movement to said valving member, said movable valving member having applied thereto a coating of Teflon-S, which is a plastic material of a group consisting of polyethylene and its halogen substitute products providing a flurocarbon-rich surface characterized by high anti-friction properties and resistance to corrosives and solvents.

2. The valve as specified by claim 1, wherein said valving member is in the form of a rotary plug.

3. The valve as specified by claim 1, wherein said valving member is in the form of a rotatable substantially spherical ball.

4. In a valve comprising a body having a fluid port therethrough, a valving member having a seat movable relative to said port for opening and closing the same, means for actuating said valving member, and an insert having a low coefficient of friction and characterized by high resistance to corrosion, said insert being fixed to the body in position to abut the valving member, the improvement of which consists in providing the seat of the valving member with a coating of Teflon-S to abut said insert.

References Cited

UNITED STATES PATENTS

| 1,998,882 | 4/1935 | Merrill | 137—375 |
| 2,973,183 | 2/1961 | Alger | 251—314 XR |
| 3,093,359 | 6/1963 | De Woody | 251—314 |
| 3,334,650 | 8/1967 | Lowrey et al. | 137—375 |

FOREIGN PATENTS

| 1,193,786 | 5/1959 | France. |
| 905,717 | 9/1962 | Great Britain. |

HENRY T. KLINKSIEK, Primary Examiner

U.S. Cl. X.R.

251—309, 315, 326